Feb. 25, 1969     H. W. MARTIN     3,430,232
COFFEE MAKER
Filed Aug. 20, 1965
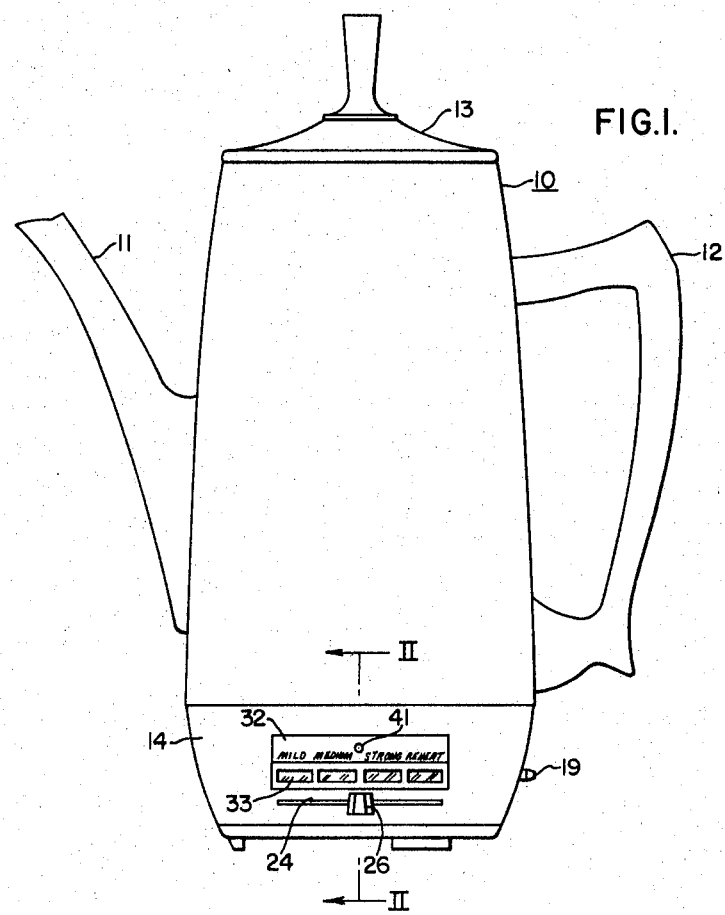
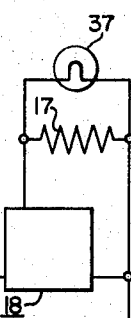
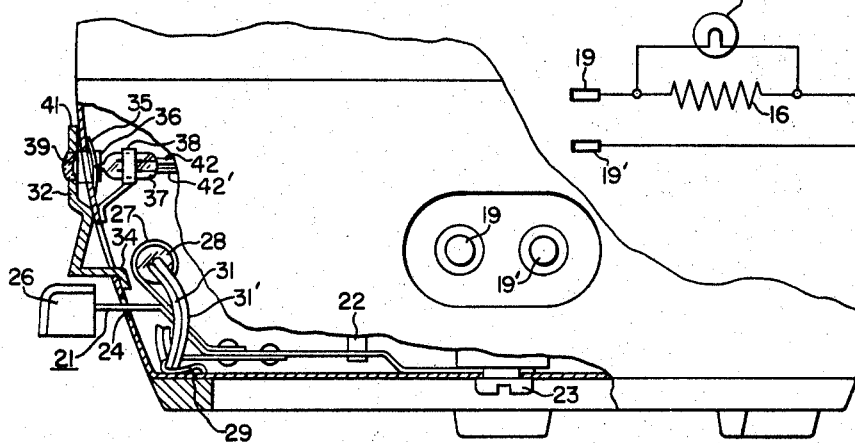
WITNESSES
*Theodore F. Wrobel*
*B. B. Sklar, Jr.*
INVENTOR
Harold W. Martin
BY
*Robert T. French*
ATTORNEY

United States Patent Office 3,430,232
Patented Feb. 25, 1969

3,430,232
COFFEE MAKER
Harold W. Martin, Shelby, Ohio, assignor to Westinghouse Electric Corporation, Pittsburgh, Pa., a corporation of Pennsylvania
Filed Aug. 20, 1965, Ser. No. 481,260
U.S. Cl. 340—417                    3 Claims
Int. Cl. G08b 5/00; G05b 11/00; F27d 11/00

This invention relates, in general, to automatic coffee makers and, more particularly, to signal indicating means for use therewith.

Automatic coffee makers of the prior art are commonly provided with a lever or knob control which is moved or turned by the operator to a written setting, for example, Mild, Medium, Strong, etc., or similar word settings. Existing coffee makers are, also, commonly provided with an illuminated signal to indicate brew cycle completion or to indicate when the coffee maker is energized. These can be confusing to the operator; i.e., which way to turn the knob or lever without reading the written setting usually carried by an escutcheon; also, the operator could be confused as to the meaning of the signal light.

Accordingly, it is the general object of this invention to provide a new and improved coffee maker.

It is a more particular object of this invention to provide, in an automatic coffee maker, separate and distinct means for signaling the condition of the coffee maker and the condition of the contents therein.

Another object of the invention is to provide, in an automatic coffee maker, simplified and inexpensive means for signaling the condition of the coffee maker and the condition of the contents therein.

Briefly, the above-cited objects are accomplished by providing two signal or pilot lights, one of which is energized when the other is deenergized and vice versa. One of the two lights is stationarily secured to one wall of the coffee maker behind a jewel or lens through which its illumination is visible to the user. This light is initially deenergized and is automatically energized at the completion of a brew cycle. A second light is movably carried within the coffee maker by a conventional control lever provided with an actuating knob external to the coffee maker. The second light can be positioned behind any one of a plurality of translucent, indicia bearing windows, depending on the position of the lever, to thereby visually indicate which of a plurality of brew strength settings, for example, Mild, etc., has been selected. This second light is initially illuminated and is adapted to be deenergized or extinguished automatically and simultaneously with energization of the first light, which as mentioned above takes place at the end of the brewing cycle.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIG. 1 is a side elevational view of an automatic coffee maker incorporating the invention;

FIG. 2 is a fragmentary cross-sectional view taken along the line II—II of FIG. 1; and FIG. 3 is a schematic wiring diagram of a circuit utilized in the coffee maker illustrated in FIG. 1.

Referring to the drawings, especially FIG. 1, reference character 10 designates generally a coffee maker to which is attached a pouring spout 11 and a handle 12, the open end of the coffee maker being closed by means of a suitable cover 13. The pump, water well, fountain tube and the coffee basket (none of which are shown) do not form a part of this invention and may, therefore, have any suitable structure. For example, the structure may be similar to that disclosed in U.S. Patent No. 2,798,143 of E. L. O'Brien, assigned to the same assignee as this application.

The coffee maker 10 comprises a hollow base 14 in which are operably supported a pump well heater 16 and a keep-warm or warming heater 17, both of which are shown schematically in FIG. 3. Sequential energization of the heaters 16 and 17 is automatically accomplished by control means represented schematically by block 18 (see FIG. 3). The control means 18 may be of any suitable construction, for example, pairs of thermostatically actuated contacts, adapted to effect energization of the pump well heater 16 and deenergization of the keep-warm heater 17 when the coffee maker 10 is connected to a source of electrical current at the start of a brewing cycle. It is believed that the specific type and arrangement of the elements of the control means 18 will be a matter of design choice obvious to one skilled in the art and, therefore, in the interest of simplifying the drawings the details of the control means 18 are not shown. Reversal of the state or condition of the heaters 16 and 17 which are supplied with household current by means of a power cord, not shown, through male terminals 19 and 19', is effected by the control means 18 after the brewing cycle has terminated. In other words, the pump well heater 16 is deenergized and the warming heater 17 is energized to thereby keep-warm the brew in the coffee maker 10.

The strength to which the coffee is brewed may be selected according to the desire of the user by moving a lever structure 21 adapted to adjust the actuation temperature of a thermostat or other suitable means associated therewith through its cooperation with a control rod 22 (see FIG. 2). One end of the lever 21 is anchored for rotation by means of a screw 23, to the pump well of the coffee maker 10 while the other end extends through a slot 24 in the wall of the hollow base 14 and has a knob 26 secured thereto.

The lever structure 21 comprises a hook-shaped member 27 adapted to carry or support a signal or pilot light 28 for rotation with the lever 21. The lever structure further comprises a clip portion 29 serving to captivate a pair of leads 31 and 31' of the light 28. The light 28 is supported adjacent a signal light escutcheon structure 32 such that the illumination therefrom shines through one of a plurality of translucent windows 33 having suitable indicia thereon indicating, for example, "Reheat," "Mild," "Medium," and "Strong." The light 28 as shown in FIG. 3 is connected in parallel with the pump well heater 16 and will, therefore, be illuminated during operation of the coffee maker 10 when the heater 16 is energized and extinguished when the heater 16 is deenergized. A flange 34 of the escutcheon structure 32 is adapted to fit inside the hollow base 14 and abut the inner surface of a substantially vertical wall thereof. The flange 34 and integral pin means 36 captivated in an opening, not shown, through the hollow base 14 by means of a spring retaining clip 35 cooperate to secure the escutcheon structure 32 to the hollow base 14.

A second signal or pilot light 37 is stationarily supported vertically above the light 28 by means of a rigid bracket 38. Illumination from the light 37 shines through an opening 39 in the hollow base 14 and a jewel or lens 41 carried by the escutcheon member 32 and can, therefore, be seen by the user. The leads 42 and 42' of the light 37 are connected in parallel with the keep-warm heater 17 and the light is, therefore, illuminated when the heater 17 is energized and is extinguished when the heater 17 is deenergized.

What is claimed is:
1. In an automatic coffee maker having electrical circuitry comprising a pump well heater, a keep-warm heater and control means for effecting sequential energization of said heaters, the improvement comprising: a hollow base member, a plurality of windows in said base member, said windows bearing indicia representing control settings, a signal light for indicating the state of one of said heaters and means for movably supporting said light contiguous said windows whereby illumination therefrom shines through only one of said windows to thereby indicate which control setting is being utilized.

2. Structure as specified in claim 1, including a second signal light adapted to indicate the state of the other of said heaters and means stationarily mounting said second signal light adjacent an opening in a substantially vertical wall of said hollow base member whereby illumination therefrom is visible from the outside of said hollow base.

3. In an automatic coffee maker having a hollow base member, in combination, a plurality of indicia bearing translucent windows carried by a vertical wall of said base member, a pump well heater in said hollow base, an actuating lever rotatably supported in said base and extending through the wall thereof, control means operatively interconnecting said actuating lever and said pump well heater, a signal light carried by said actuating lever and adapted to indicate the condition of said pump well heater, said light being supported by said lever in a position where illumination therefrom shines through one of said windows to thereby visibly indicate the setting of said control means, including a keep-warm heater and a pilot light operatively connected thereto and adapted to indicate the condition thereof and means for stationarily mounting said pilot light adjacent an opening in the side wall of said base whereby illumination therefrom is visible from outside of said hollow base.

References Cited
UNITED STATES PATENTS

| | | | |
|---|---|---|---|
| 2,773,166 | 12/1956 | Best | 219—441 |
| 2,613,630 | 10/1952 | McNairy | 116—129 |
| 3,282,196 | 11/1966 | Manship et al. | 99—285 X |

JOHN W. CALDWELL, *Primary Examiner.*

D. L. TRAFTON, *Assistant Examiner.*

U.S. Cl. X.R.

219—441; 99—285; 340—332